US005595279A

United States Patent [19]
Wilkins et al.

[11] Patent Number: 5,595,279
[45] Date of Patent: Jan. 21, 1997

[54] SORTATION CONVEYOR

[75] Inventors: John J. Wilkins; Walter L. Steffens, both of Cincinnati, Ohio; Timothy A. Koeninger, Fort Thomas, Ky.; Martin A. Heit, Cincinnati, Ohio

[73] Assignee: Western Atlas Inc., Hebron, Ky.

[21] Appl. No.: 467,842

[22] Filed: Jun. 6, 1995

[51] Int. Cl.$^6$ ................................................... B65G 47/46
[52] U.S. Cl. ............................................................ 198/370.02
[58] Field of Search ................................ 198/370.02, 890

[56] References Cited

U.S. PATENT DOCUMENTS

| 4,711,341 | 12/1987 | Yu et al. | 198/370.02 |
| 5,127,510 | 7/1992 | Cotter et al. | 198/370.02 |
| 5,131,522 | 7/1992 | Fujio | 198/370.02 |

Primary Examiner—Joseph E. Valenza
Attorney, Agent, or Firm—Brian L. Ribando

[57] ABSTRACT

A sortation conveyor includes elongated slats, of rectangular configuration, travelling in pairs along an endless path. The conveyor is characterized by unique diverters, and mounting assemblies therefor. The diverters are formed of a durable plastic, with an additive for lubricity. The additional lubricity allows the bearing surfaces of the diverter to slide laterally along the adjacent pair of slats, with reduced friction. A metal I-beam insert strengthens the web of the diverter, while reducing the thickness thereof; the reduced thickness allows the web of the diverter to pass easily between adjacent pairs of slats. The diverter pin has flat sides, in horizontal cross-section, for cooperation with pin guides and switches. Two urethane blocks fill the hollow shell at the upper end of the diverter, and the protruding edges of the blocks are angled to impart a downward force to a package striking same. The sides of the web are angled to lift, and sweep out, debris that may fall into the narrow gap defined between adjacent slats of each pair. The leading edge of the diverter is curved downwardly to prevent thin parcels, such as envelopes, from slipping thereunder. End caps are bolted into engagement with central apertures in each slat of a pair of slats, and the heads of the bolts are received in slots in a side carriage plate. The carriage plate is secured, in turn, to one of the endless drive chains that advances the sortation conveyor along its path of travel. The bolts enable the quick assembly, and disassembly, of the mounting assembly, so that the slats and diverters can be repaired and/or replaced, as needed, with simple manual tools.

20 Claims, 9 Drawing Sheets

SORTATION CONVEYOR

FIELD OF THE INVENTION

This invention relates generally to sortation conveyors which divert selected packages travelling along the main line to one, or more, branch lines. More particularly, the invention pertains to refinements in the diverters, and mounting assemblies therefor, utilized within such sortation conveyors.

BACKGROUND OF THE INVENTION

Sortation conveyors comprise several elongated conveyor tubes, or slats, travelling in pairs, along an endless path, defined between parallel, longitudinally extending, side frames. A diverter, also known as a slider, is operatively associated with each pair of tubes. The diverter includes an upper portion that extends above the pairs of tubes to contact the articles travelling longitudinally along the apron defined by the cooperating pairs of tubes. The diverter further includes a central shaft that passes between the pair of tubes, an annular bearing, and a depending pin which contacts a diverter track and/or diverter switch to shift the diverter laterally across the article carrying surface defined by the elongated conveyor tubes.

A first endless chain extends longitudinally along the sortation conveyor, and is situated inboard of one side frame, while a second endless chain extends longitudinally along the sortation conveyor, and is situated inboard of the second side frame. Each endless chain passes over a first sprocket at the infeed end of the conveyor, and passes over a second sprocket at the discharge end of the conveyor, thus forming an upper run and a lower run of chain. The conveyor motor drives one, or both, sprockets, and the mounting assembly for each pair of slats is secured to both endless chains.

Sortation conveyors of this general organization are well known in the prior art. Representative sortation conveyors are shown in U.S. Pat. No. 4,711,341, granted Dec. 8, 1987, to Thomas C. Yu et al; in U.S. Pat. No. 4,760,908, granted Aug. 2, 1988, to Harry E. Houghton; and in U.S. Pat. No. 5,127,510, granted Jul. 7, 1992, to David H. Cotter et al.

SUMMARY OF THE INVENTION

The present invention contemplates a sortation conveyor employing uniquely configured diverters that perform functions unrealizable with known diverters, such as pushers 25 shown in FIGS. 8–9 of Yu et al; such as slider 108 shown in FIGS. 3–5 of Houghton; and such as diverter shoe 28 shown in FIGS. 1–2 of Cotter et al.

More specifically, the uniquely configured diverters sweep debris out of the gap which separates the pair of adjacent slats, on both the upper run of the sortation conveyor and on the return run. Additionally, the diverters include a forwardly extending lip that fits snugly about the rectangular slats and precludes thin parcels, such as envelopes, from slipping below the diverter.

The shape of the diverters is superior to known diverters, and is characterized by an elliptical generally rounded top. The elliptical top brushes gently against a package traveling along the conveyor, even in the event of a jam.

The shell and spine of the uniquely configured diverters are formed of a durable plastic, such as nylon, with an additive for lubricity. The lubricity enables the bearing surfaces defined on the diverter to slide on the slats of the conveyor with minimum friction.

A urethane bumper fills the shell of the top section of the diverter. The bumper extends outwardly beyond the shell, and the face of the bumper that projects into the path of packages travelling along the conveyor is inclined at an angle to the vertical. The inclined bumper face progressively increases the applied diverting force to the package and insures that the point of first contact between the diverter and the package is as high as possible on the package. The bumper absorbs the energy of impact as the package hits the diverter, and also deadens the noise associated with the impact.

The present invention further realizes other advantages attributable to refinements in the internal webbing of the rectangular slats, the end caps for joining pairs of slats together, the carriage secured to the endless chains, and the fasteners for securing the carriage to the end caps and the internal webbing within each slat. The fasteners are self-threading and comprising a threaded shank, a tapered segment, an annular shoulder, and an enlarged head. A drive socket is formed in the outer surface of the head, and the carriage has a pair of spaced keyhole slots to receive the heads of the bolts.

The foregoing components comprise a mounting assembly for the slats of the sortation conveyor that is easily assembled, and disassembled, without welding the end caps to the slats, as is conventional practice. The slats may be easily removed, repaired, and/or serviced, and access to the diverters is obtained with minimum conveyor down-time.

A miniature metal I beam serves as an insert for the web portion of the diverter. The preferred metal is aluminum, which possesses a coefficient of expansion similar to the toughened nylon which surround the insert. The web of the diverter can thus be reduced in thickness to pass more easily between adjacent pairs of slats, without sacrificing strength and durability.

The depending diverter pin of the instant diverter, when seen in a horizontal cross-sectional view, is a flat-sided football, and is contrasted with the conventional pin, which is circular in plan view. The elliptical ends of the pin pass more readily through switches and the flat sides provide a larger wear surface. The diverter pin may also be hard coated for enhanced wear and frictional characteristics.

Numerous other advantages attributable to the instant sortation conveyor will become readily apparent to the skilled artisan when the appended drawings are construed in harmony with the ensuing specification.

DESCRIPTION OF THE PREFERRED EMBODIMENT OF THE INVENTION

Figure 1:
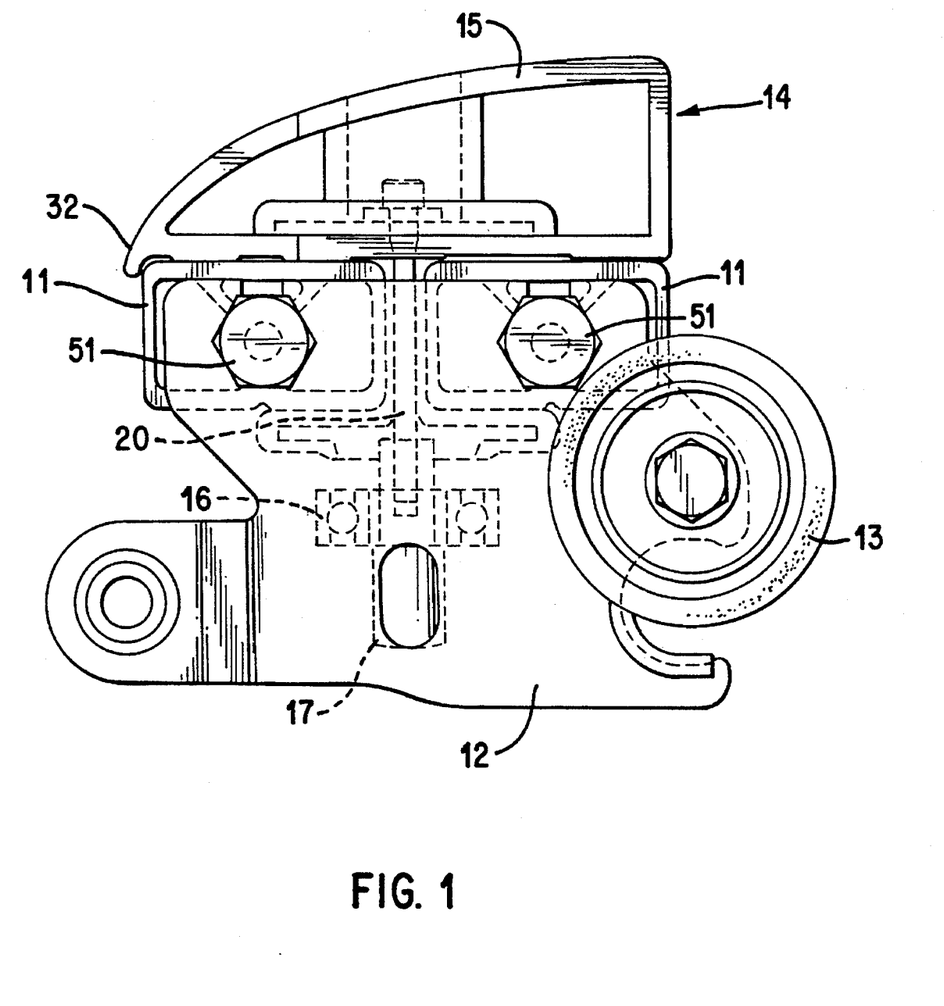
FIG. 1 is a side elevational view of a flight assembly of a sortation conveyor constructed in accordance with the principles of the instant invention, such view showing a diverter secured between a pair of slats, and a side plate secured to said slats.
Figure 4:
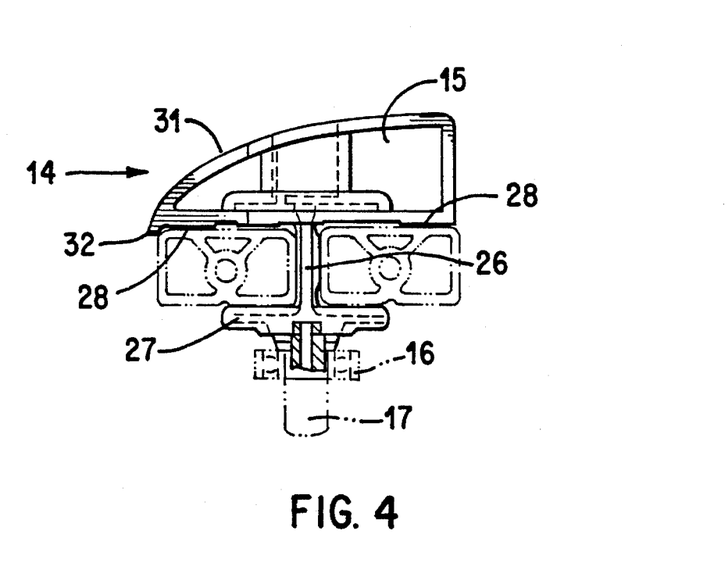
FIG. 4 is a side elevational view of the diverter shown in FIG. 1, with the side plate removed and the slats shown in phantom.
Figure 5:
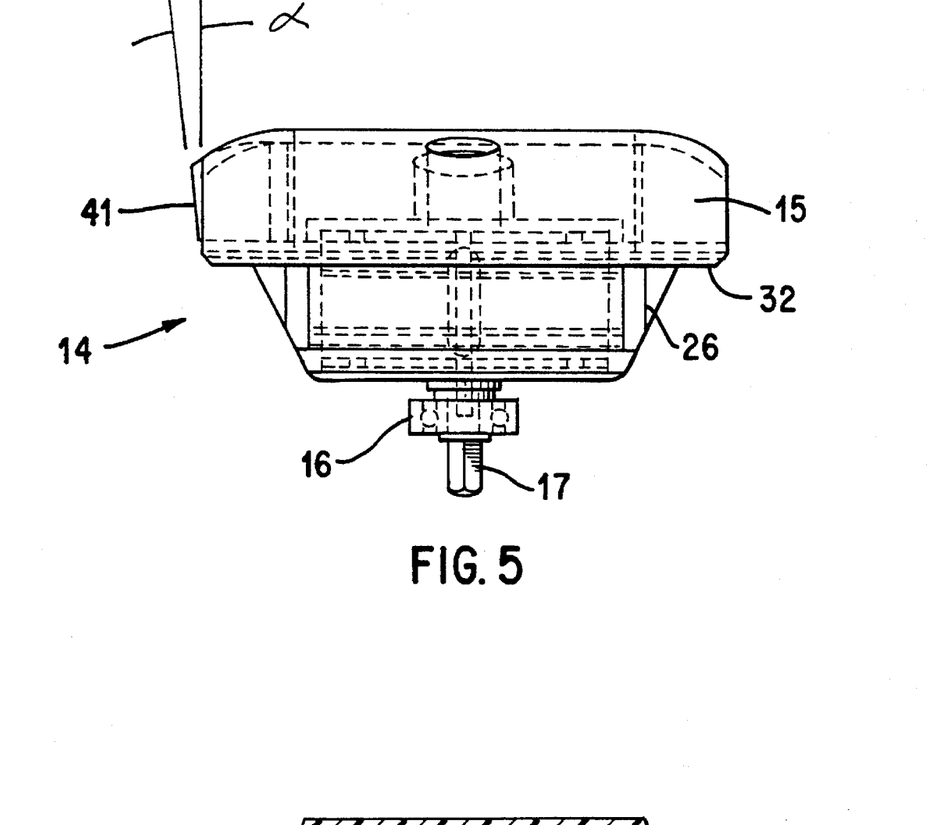
FIG. 5 is a front elevational view of the diverter shown in FIG. 4.
Figure 6:
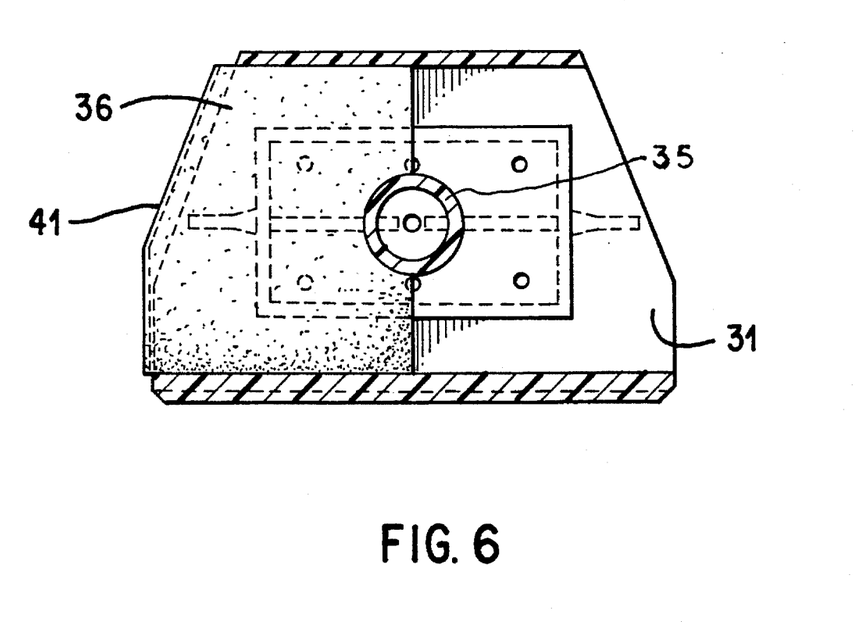
FIG. 6 is a top sectional view of the diverter shown in FIGS. 4 and 5.
Figure 16:
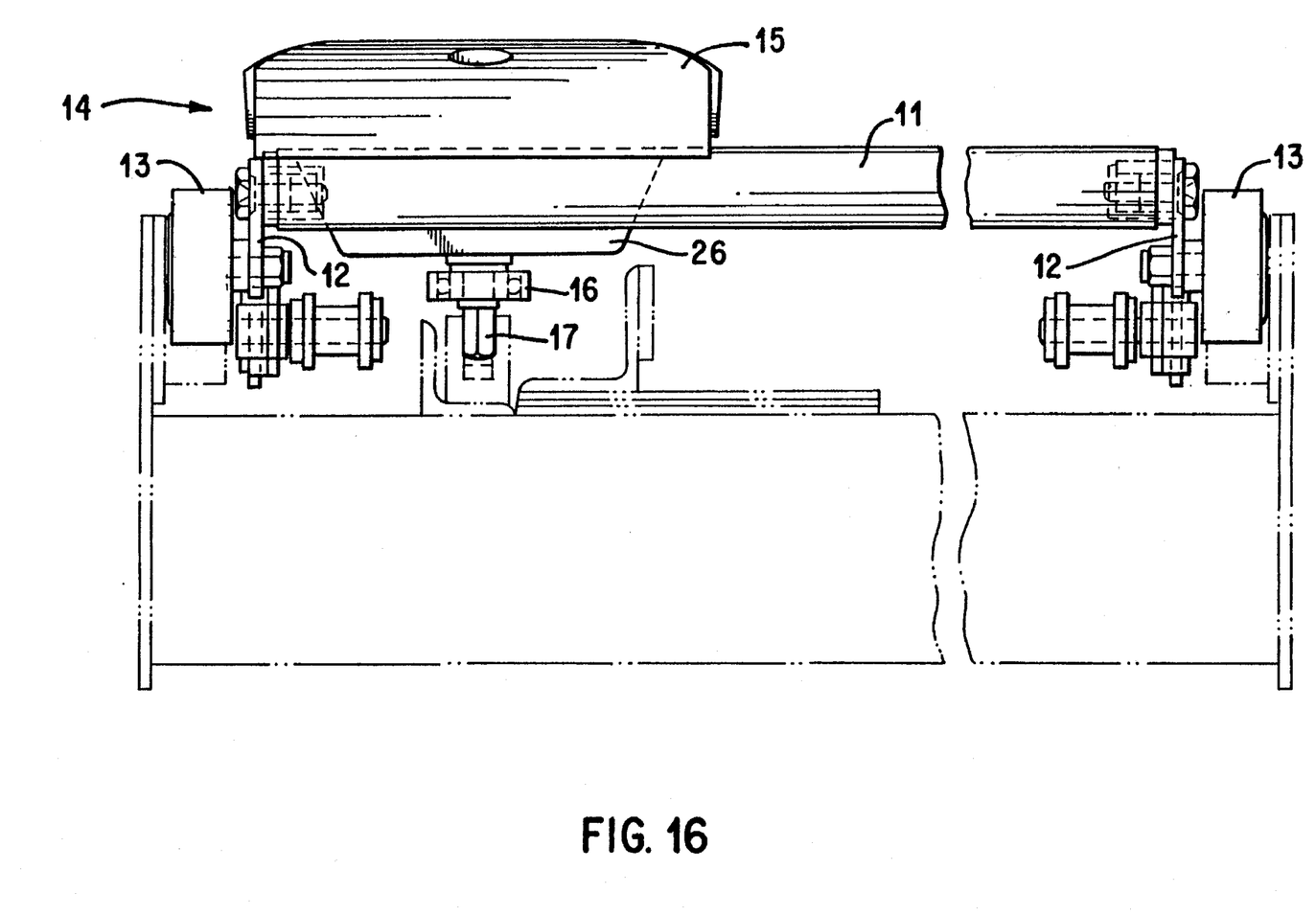
FIG. 16 is a vertical cross-sectional view of the sortation conveyor showing the diverter of FIGS. 4–6 operatively associated with a slat, the support wheels for the side plates, and the depending pin of the diverter moving within cam guide rails.

Referring now to the drawings, which depict a sortation conveyor constructed in accordance with the principles of the instant invention, FIG. 1 shows a flight assembly comprising two slats 11 of the sortation conveyor secured to a side plate 12 of a carriage. The side plate includes a support wheel 13 which supports plate 12 on a track (shown in FIG. 16) and a side load wheel 116 which rides along the inside surface of the side rail of the conveyor. Side load wheel 116 is not shown in FIG. 1, but is visible in FIGS. 13 and 14 Each pair of slats 11 supports a single diverter 14, indicated generally by reference numeral 14. Diverter 14 comprises a pusher 15, a bearing 16, and a diverter pin 17, as shown in FIG. 4. In operation, the diverter 14 is guided by the contact of diverter pin 17 and the bearing 16 with cam guide rails (shown in phantom in FIG. 16) which determine the lateral position of the diverter on the surface of the conveyor. The use of the diverter pin 17 and the bearing 16 for this purpose is well known but the shape of diverter 14, in general, and diverter pin 17 in particular, is unique.

Figure 2:
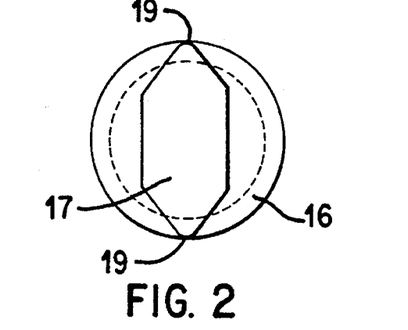
FIG. 2 is a bottom view, on an enlarged scale, of the depending pin of the diverter of FIG. 1.
Figure 15:
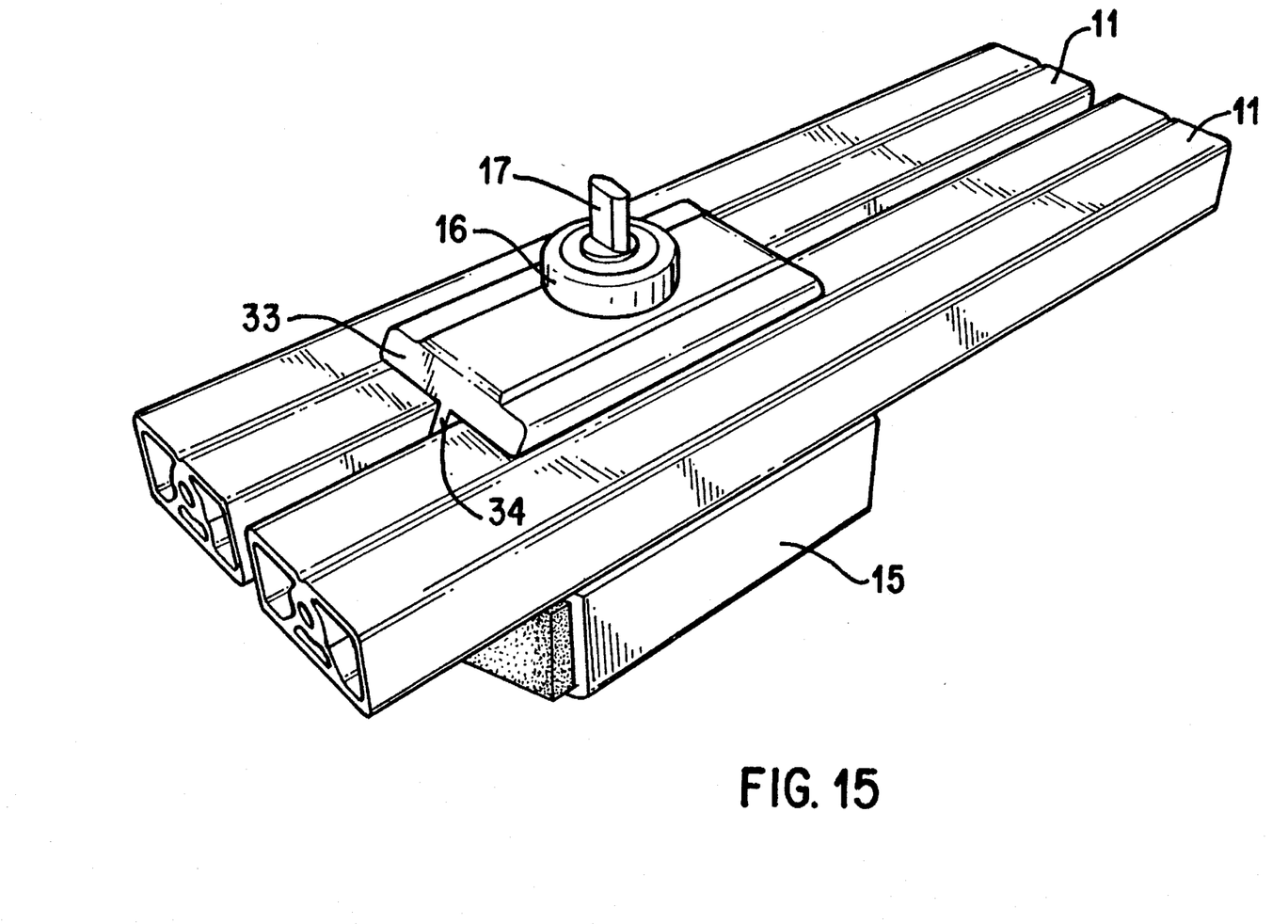
FIG. 15 is a perspective view of the diverter of FIGS. 4–6 shown in operative relationship to a pair of slats, the diverter and slats being shown in the upside relationship assumed while travelling on the return run of the sortation conveyor.

The diverter pin 17 has the shape of a flat sided football in horizontal cross-section, as best seen in FIGS. 2 and 15. The ends 19 of the pin 17 are aligned with the longitudinal axis of the conveyor and allow the pin to pass through switches (not shown) which are used in the conveyor more easily than the normal round pin. The flat sides of the pin present a larger wear surface to the pin guides than a pin having curved sides and the flat pin sides are quieter than curved sides as they traverse gaps in the pin guides.

Figure 3:
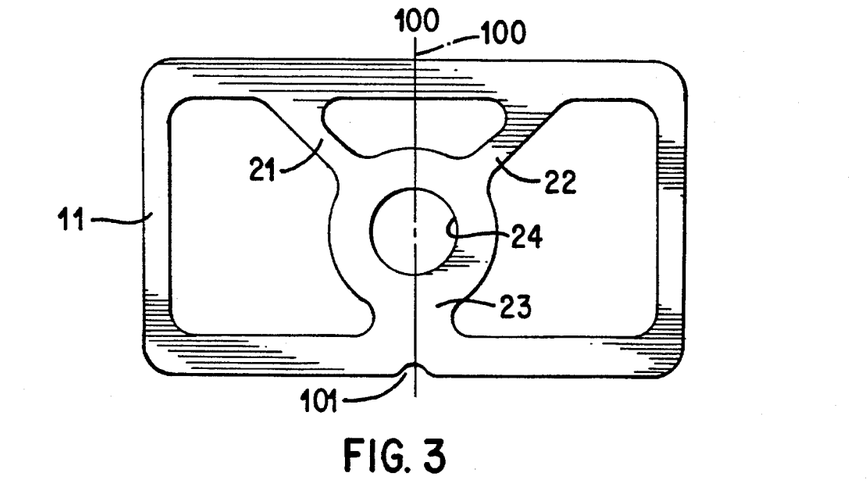
FIG. 3 is a side elevational view, on an enlarged scale, of one of the slats shown in FIG. 1.

A representative rectangular slat 11 is best seen in FIG. 3. The slat is extruded with internal webbing 21, 22, and 23 to impart strength and rigidity to the structure. An aperture 24 is formed by the annular webbing portion 23 and the aperture receives a self-threading screw to secure a side plate 12 to the slat. The aperture 24 is located on the center line 100 of slat 11. The side plate is used to secure the slat to the carriage 12 shown in FIG. 1. Hard-coat anodized aluminum is the preferred material for slat 11, and the slat may be extruded. The slat includes indicia in the form of a groove 101 which identifies the bottom of the slat for correct orientation of the slat during the assembly operation.

The diverter 14 is best shown in FIG. 4. The diverter 14 comprises the pusher 15, a web 26, and a retainer 27 formed on the lower end of the web. A plurality of surfaces 28 formed on the underside of the pusher, the side of the web and the top surface of the retainer are bearing surfaces which ride on the outside surface of the slats 11. The web and retainer include a molded-in, aluminum insert 39, shown in FIG. 7, which is I-shaped in cross section and gives additional strength to the web 26 and retainer 27.

The top surface 31 of the diverter is sloped downwardly toward its front end and includes a lip 32 which extends slightly below the top surface of the slat on which the diverter is mounted. The lip 32 allows the diverter to scoop under any packages (not shown) which are on the conveyor surface rather than allowing a thin package, such as a letter, to become trapped between the top of the slats 11 and the underside of the diverter top 15.

Diverter 14 is designed to sweep debris out of the gap which separates two adjacent slats 11, both when the diverter is on the top surface of the conveyor moving to the discharge end, and when the diverter is on the bottom surface of the conveyor returning to the feed end. The design includes a lowered front lip 32 which extends beneath the surface formed by the adjacent slats 11. Additionally, the sides 34 of the web 26 of the diverter are angled to lift and sweep out of the gap any debris which has become lodged between two adjacent slats. As shown in FIG. 15, the angled edges 34 are especially important in clearing out materials which may fall through the top of the conveyor onto the return run of the conveyor as the diverter is returning to the infeed end. The angle of web edge 34 is continued by the angled face 33 of the retainer 27 which will lift any debris on the undersides of the slats as the diverters are repositioned to one end of the slats 11 as the diverters return to the infeed end.

Diverter 14 has an elliptically rounded top which is more gentle with a package (not shown) which rides over the top of the pusher 15 of diverter 14, in the event of a jam. Diverter 14 comprises a rigid plastic shell 31 which is hollow, and receives two soft bumpers 36. The bumpers protrude beyond the side-face of the pusher and provide a soft surface to impact against packages which are to be diverted. FIGS. 1 and 4–6 show the pusher with one bumper removed in order to show the interior construction of the hollow plastic shell 31.

Figure 8:
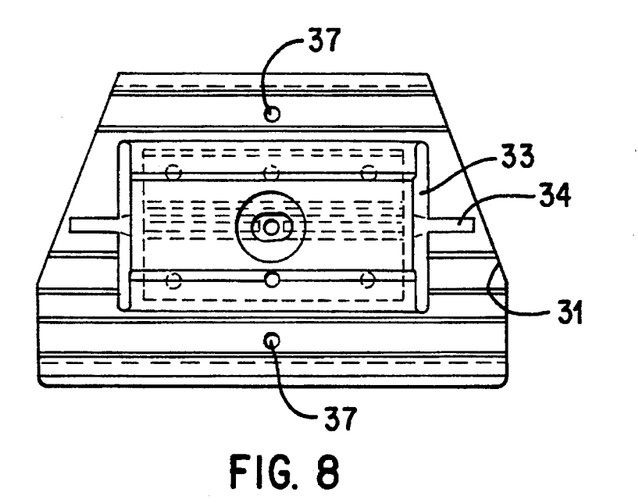
FIG. 8 is a bottom view of the diverter of FIGS. 4–6, such view revealing inspection holes.
Figure 9:
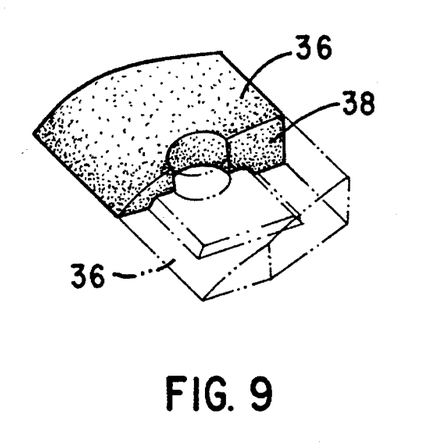
FIG. 9 is a perspective view of the bumper employed within the diverters of FIGS. 4–6.

Each bumper fills one half of the hollow shell 31. The meeting line of two bumpers placed in the left and right sides of pusher 15 is visible through two inspection holes 37 shown in FIG. 8, which allow air to escape from the interior of the shell as the bumpers are pushed to their home position and also provide visual inspection of the proper positioning of the bumpers in the shell. Holes 37 also allow access to the interior of the shell so that adhesive can be placed on the mating surfaces 38 of the bumpers to hold the bumpers in place.

Each bumper 36 is formed from urethane foam, which is a soft "dead blow" material, to prevent package bounce when the bumper hits the package. The faces 41 of the bumper, which contact the package are inclined at an angle to the vertical, and the inclined face tends to pull a package down onto the slat. As the inclined bumper face 41 moves against a package, the contact area between the bumper face and the package increases to apply a progressively increasing divert force to the package. The progressively increasing divert force results in a more gentle motion of the package and lessens the tendency of the package to bounce off, or roll over, the top 15 of the diverter 14. The soft material absorbs the energy of impact as the pusher hits the package and the absorption of energy assists in preventing the pusher from sweeping under an article, rather than pushing an article to the side of the conveyor as intended. The "dead blow" material has a very slow rebound, and slowly resumes its original shape after impact with the package has taken place. The bumper material also has a very high coefficient of friction which aids in gripping and pushing on a package, and has a sound deadening effect. Since the bumper material completely fills the hollow shell 31 of the pusher, and extends outwardly beyond the shell, the impact of the pusher against the package does not produce a resonant noise in the pusher shell.

The shell and the web of the pusher are molded of toughened nylon with a PTFE additive for lubricity. The lubricity imparted by the PTFE is an important feature since this allows the bearing surfaces 28 of diverter 14 to slide on the hard-coat anodized extruded aluminum slats 11 with minimum friction.

Figure 7:
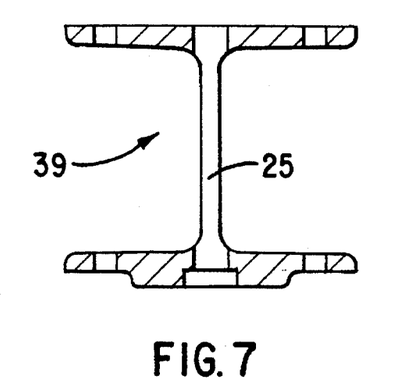
FIG. 7 is a sectional view of the metal insert employed within the diverter of FIGS. 4–6, such view taken on an enlarged scale.

The web 26 of diverter 14 contains a reinforcing insert 39 of aluminum which has a coefficient of expansion similar to that of the toughened nylon, so that as the plastic cools and shrinks, the aluminum shrinks at about the same rate to minimize stress in the cooled plastic. The aluminum insert 39, as shown in FIG. 7, is a miniature "I"-beam which is the backbone of the diverter 14, and allows the web 26 to be formed with a minimum thickness, thus requiring only a minimum gap for clearance between adjacent slats, as shown in FIGS. 1 and 15. A vertical bolt 20 passes through a bore 25 in the web 26 and secures the pusher shell 31, the lower bearing 16, and the diverter pin 17, into a rigid assembly. The lower end of the bolt 20 is threaded to engage mating threads in a bore formed in the upper portion of the diverter pin 17. The diameter of the bolt 20 is much less than the diameter of the diverter pin 17 and in the event of a jam, the design allows the bolt 20 to break off flush with the top of the diverter pin. This will ensure that there is no bent diverter pin, or bolt stub, extending from the bottom of the retainer 27 which can cause further damage to the cam guide tracks or diverter switches before the sorter can be brought to a stop and repaired. The diverter pin 17 is used to guide the pusher through switches to change the direction of the pusher on the conveyor surface and the bearing 16 follows cam guides (not shown) formed beneath the conveyor surface to direct the pusher once it has left the switch. The use of a pin and bearing for this purpose is old and well known.

Figure 10:
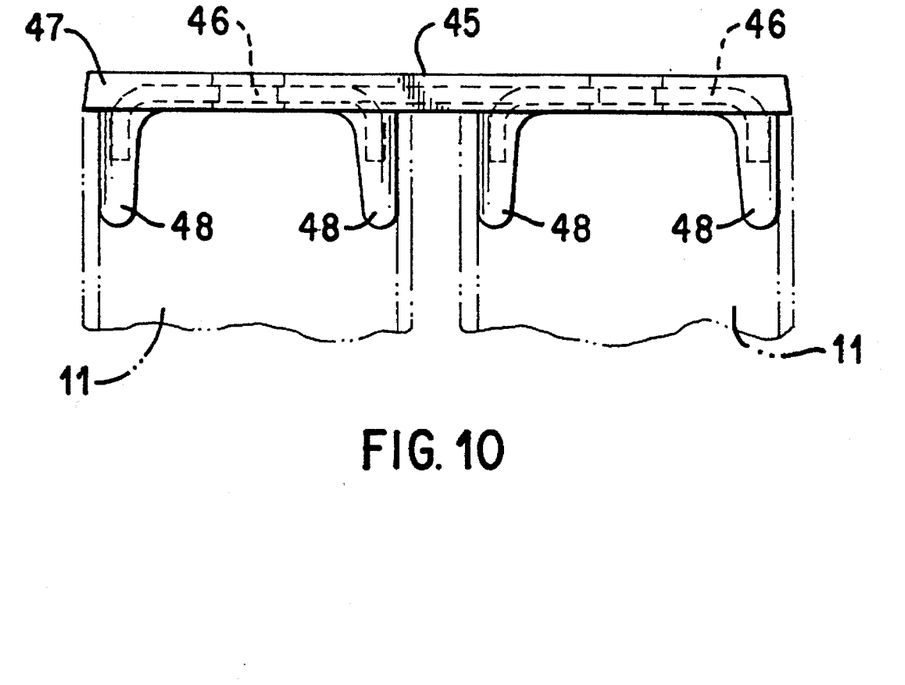
FIG. 10 is a top plan view of the end cap for a pair of slats, with only fragmentary portions of the slats being shown.
Figure 11:
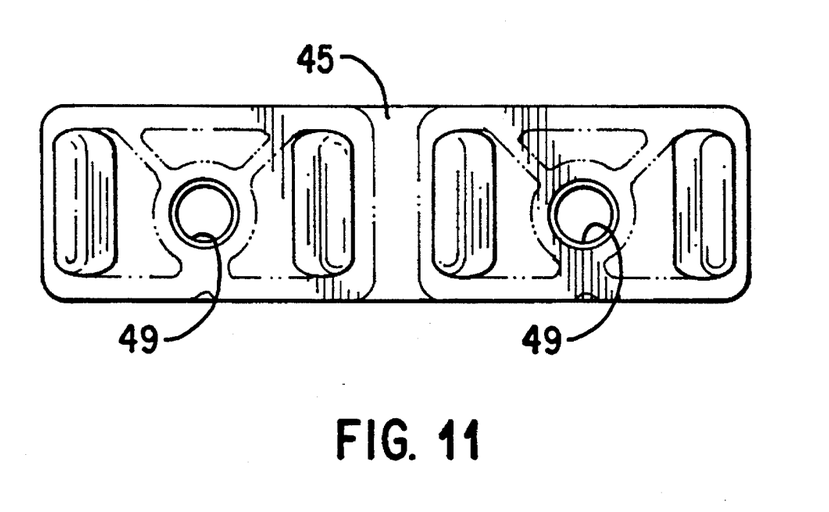
FIG. 11 is a side elevational view of the end cap shown in FIG. 10, with the pair of slats being shown in phantom outline.

Each pair of slats is held together at either end by an end plug 45, as shown in FIGS. 10 and 11. The end plug comprises a steel backbone 46 which is covered by a polyurethane material 47. The compressibility of urethane allows for relaxed manufacturing tolerances, while still ensuring a tight fit of the legs 48 of the end plug 45 into the ends of slats 11. The urethane also functions as a sound vibration dampener between the aluminum slats 11 and the side plate 12 of the carriage. The end plug includes two holes 49 which receive screws 51, shown in FIG. 12, to fasten the slat assembly to the side plate 12 of the carriage.

Figure 12:
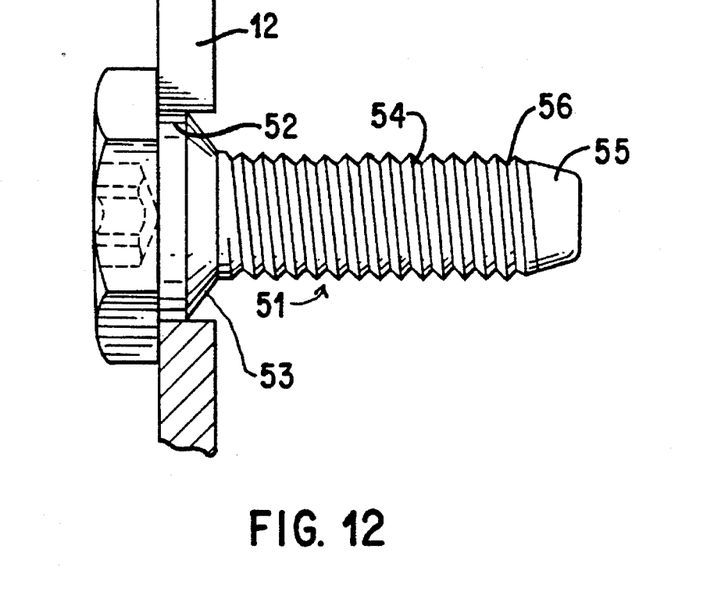
FIG. 12 is a side view, on an enlarged scale, of the fastener for securing a side plate to the end cap for a pair of slats.

The screw 51 is a self-threading and self-locking fastener which obviates the need to tap the aperture 24 in the webbing of the slat or to use a thread-locking compound or lock washers. The combination of the end plug 45 and the self threading fastener 51 allows the slats to be attached to the side plate 12 of the carriage with a minimum of effort. The legs 48 of an end plug 45 may be forced into the ends of two slats and the fasteners 51 are used to secure the slats to the carriage plate 12 with the end plug 45 trapped therebetween. No welding is required to secure the end plug to the slats and the apertures 24 on the slats do not have to be tapped to receive the fasteners 51 since the fasteners thread the aperture 24. The fastener is formed with a shoulder 52 and a taper 53 which joins the shoulder 52 to the shank 54. The fastener works in concert with the side plate 12 of the carriage assembly to allow easy removal of a pair of slats from the carriage assembly as described below. The tip of the fastener includes an unthreaded point taper section 55 of reduced diameter and one or two turns of tapered incomplete threads 56 with unfinished crests which enable the fastener to be self-threading.

Figure 13:
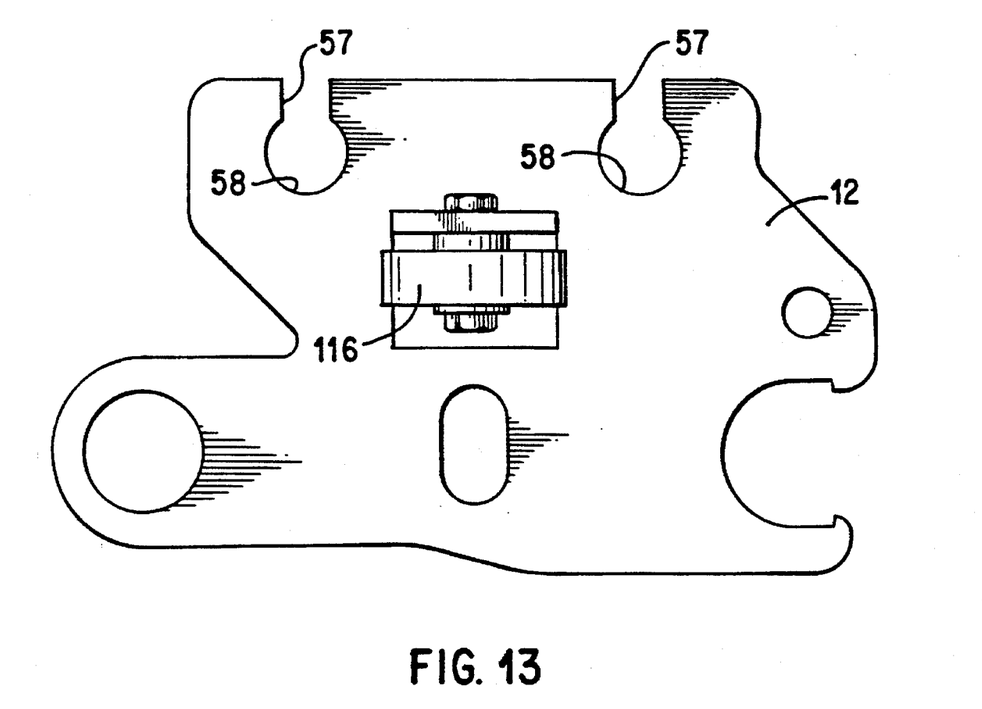
FIG. 13 is a side elevational view of the side plate that retains the fasteners for the end cap for a pair of slats in fixed position, the side plate being part of a carriage that advances the slats along the longitudinal extent of the sortation conveyor.
Figure 14:
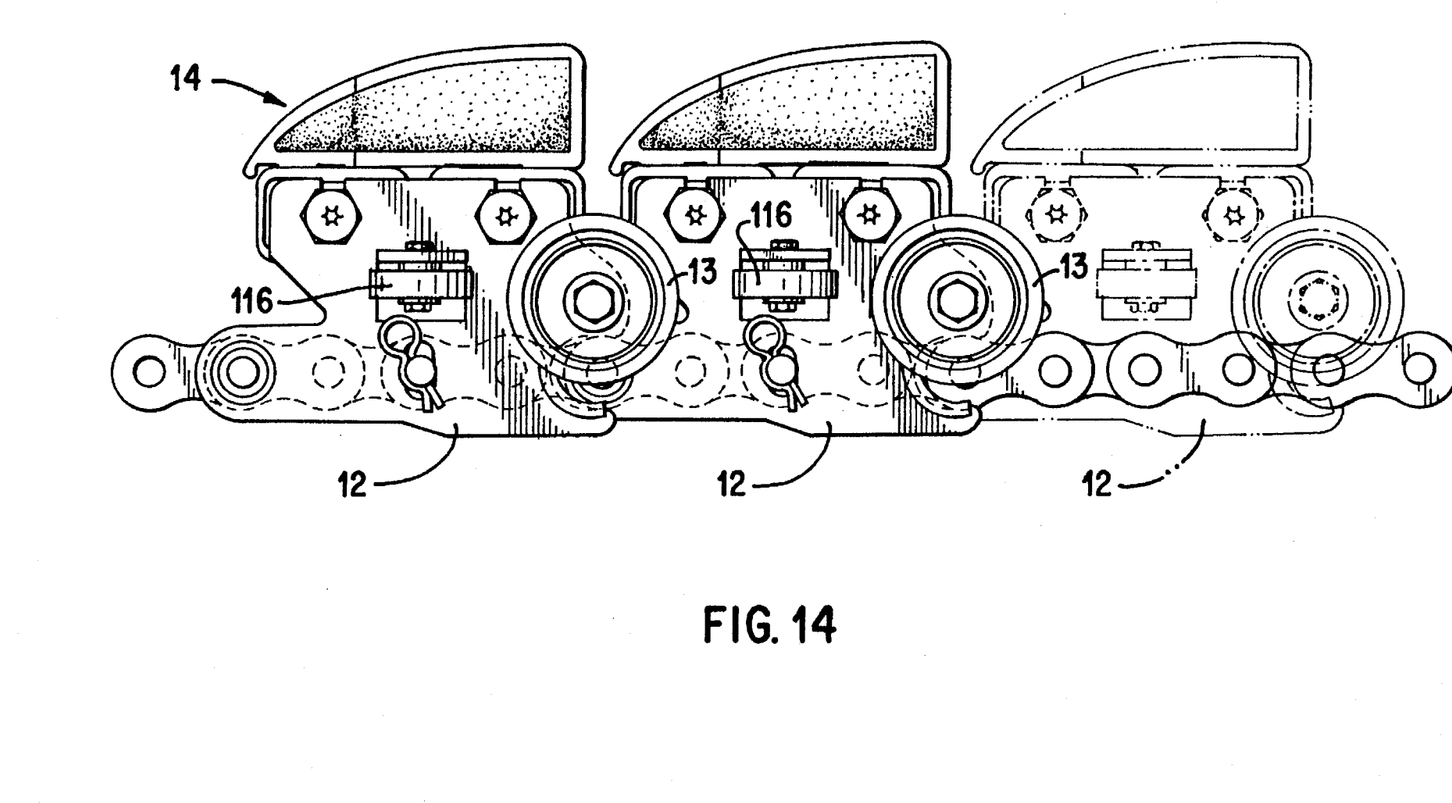
FIG. 14 is a side elevational view of three flight assemblies of the sortation conveyor, such view showing the connection of a drive chain to a plurality of side plates.

The side plate 12 of the carriage is shown in FIG. 13, and includes two key-hole slots 57 which receive the self-threading fasteners 51. The round hole portion 58 of each slot is dimensioned to receive the shoulder 52 of self-threading fastener 51, and the shank 54 passes through the slot 57. The fastener only has to be loosened three turns to align the shank 54 of the fastener with the slot 57 of the key-hole slot. At that time, the end plug 45 and the slats which are attached thereto can be lifted free of the carriage assembly by passing the shanks 54 through the keyhole slots. Removal of the end plug allows access to the gap between the two slats, and once the end plug 45 is removed, diverter 14 can be slid off the slats 11 and easily replaced.

We claim:

1. A diverter adapted to be retained in operative position between adjacent pairs of slats in a sortation conveyor:

a) said diverter including a pusher comprising a hollow plastic shell (31) that slopes downwardly from its rear surface toward its front surface and terminates in a lowered front lip (32) that depends below the top surface of the slats, b) a stem (26) depending below said pusher, c) a retainer (27) formed on the lower end of said stem, adapted to fit below the slats, d) a diverter pin (17) depending below said retainer, and bearings (16) secured about said pin, said pin and bearing adapted to cooperate with camming surfaces to determine the lateral position of said diverter on the conveyor, and e) bearing surfaces (28) defined on the underside of said shell and on said stem to ride on the surface of the slats.

2. A diverter as defined in claim 1 wherein a bumper fills said hollow shell and protrudes beyond the sides thereof to provide soft surfaces to impact against the packages traveling on the conveyor.

3. A diverter as defined in claim 2 wherein the outer surfaces (41) of said bumper are angled downwardly to force the packages against the slats of the conveyor.

4. A diverter as defined in claim 3 wherein said bumper is formed of a soft, "dead blow" material, which absorbs the energy of impact when the diverter hits a package traveling on the conveyor.

5. A diverter as defined in claim 4 wherein said soft, "dead blow" material is urethane foam.

6. A diverter as defined in claim 2 wherein said bumper is formed of two inserts of equal size, and inspection holes are formed in said shell to allow visual inspections of the inserts for alignment thereof.

7. A diverter as defined in claim 1 wherein said plastic shell and said stem are formed of nylon, with an additive for increased lubricity to minimize friction at said bearing surfaces.

8. A diverter as defined in claim 1 wherein said stem contains a reinforcing metallic insert.

9. A diverter as defined in claim 8 wherein said metallic insert is an I-beam, and the metallic insert possesses a coefficient of expansion similar to that of the material from which the diverter is formed.

10. A diverter as defined in claim 9 wherein said metallic insert is formed of aluminum, and said diverter is formed of nylon, with a PTFE additive for lubricity.

11. A diverter as defined in claim 8 wherein said I-beam comprises a top plate, a vertical web, and a bottom plate, said top plate being incorporated into said hollow plastic shell to reinforce same, said bottom plate being incorporated into said retainer to reinforce same, and said vertical web being incorporated into said stem to reinforce same.

12. A diverter as defined in claim 1 wherein said stem has a vertical bore (25), and a bolt (20) passes through said bore to join said plastic shell, said spine, said bearings, and said diverter pin into a rigid assembly.

13. A diverter as defined in claim 1 wherein said hollow plastic shell has a front lip with corners at opposite ends thereof, said corners being truncated so that debris caught in the gap between adjacent pairs of slats can be swept out by said diverter.

14. A diverter as defined in claim 1 wherein said stem includes edges that are angled to lift and sweep out any debris which has become lodged between adjacent slats.

15. A diverter as defined in claim 1 wherein said pin is shaped as a football with flattened sides, when viewed in horizontal cross-section.

16. In combination, a pair of elongated slats for use in a sortation conveyor and a diverter that slides laterally along said slats to direct packages traveling longitudinally along the conveyor, said slats comprising rectangular metallic extrusions with internal webbing (21, 22, 23), said diverter including a pusher (15) comprising a hollow plastic shell that slopes downwardly from its rear surface toward its front surface and terminates in a lowered front lip, a stem (26) depending below said pusher, and a retainer formed on the lower and of said stem, said plastic shell fitting atop said rectangular extrusion so that front lip projects downwardly below the upper surface of the slat and the diverter is retained in engagement therewith, said stem fitting between adjacent slats of each pair of slats, said retainer contacting the lower surfaces of the adjacent slats, and bearing surfaces defined on the bottom of said pusher, on said stem, and on said retainer to contact said slats, said bearing surfaces being formed of a plastic material that minimizes friction as said diverter moves transversely along said pair of slats.

17. The combination of a pair of elongated slats and a diverter as defined in claim 16 wherein as aperture (24) is formed in said internal webbing along the center line of each slat, and an end plug (45) holds together adjacent pairs of slats, said end plug having holes (49) formed therein that are aligned with the aperture in the internal webbing of each slat, and fasteners (51) are passed through said holes in said end plug and into said apertures to mechanically join said end plugs to said slats.

18. The combination as defined in claim 17 wherein said end plug comprises a metal backbone (46) with inwardly projecting legs (48) at opposite end thereof, a polyurethane material covering said metal backbone, and said legs are inserted into said slats to position said end plug for securement thereto.

19. The combination as defined in claim 18 further including a carriage plate, said plate having slats formed therein, the heads of said bolts being received therein so that said carriage plate is secured to said end cap and said pair of slats receiving said end cap.

20. The combination as defined in claim 16 wherein a side load wheel is secured to each carriage plate and extends laterally therefrom.

* * * * *